US000001476H

United States Statutory Invention Registration [19]

[11] Reg. Number: H1476

Braun

[43] Published: Sep. 5, 1995

[54] CIRCUITRY FOR IGNITING DETONATORS

[75] Inventor: Christopher G. Braun, Neptune, N.J.

[73] Assignee: The United States of America as represented by the Secretary of the Army, Washington, D.C.

[21] Appl. No.: 766,592

[22] Filed: Sep. 26, 1991

[51] Int. Cl.[6] ..... F42C 1/12

[52] U.S. Cl. ..... 102/220; 102/211; 102/216; 102/202.3

[58] Field of Search ..... 102/218, 219, 220, 211, 102/212, 214, 216, 202.1, 202.2, 202.3, 202.7

[56] References Cited

U.S. PATENT DOCUMENTS

| | | | |
|---|---|---|---|
| 2,514,434 | 7/1950 | Windes | 102/219 |
| 3,106,160 | 10/1963 | Harnau et al. | 102/216 |
| 3,732,564 | 5/1973 | Kuck et al. | 102/214 |
| 3,853,066 | 12/1974 | Campagnuolo et al. | 102/220 |
| 4,218,977 | 8/1980 | Kalmus | 102/214 |
| 4,934,268 | 6/1990 | Levin | 102/216 |
| 4,954,869 | 9/1990 | Bauer | 357/38 |
| 5,055,700 | 10/1991 | Dhyanchand | 290/31 |

FOREIGN PATENT DOCUMENTS

| | | | |
|---|---|---|---|
| 2152427 | 2/1977 | Germany | 102/218 |

*Primary Examiner*—Stephen M. Johnson
*Attorney, Agent, or Firm*—Michael Zelenka; John M. O'Meara

[57] ABSTRACT

A MOS controlled thyristor is incorporated into detonator ignition circuitry to reduce the physical size thereof, while also providing for ignition reliability enhancement. Signals to either prevent or trigger conduction of detonator ignition energy through the MOS controlled thyristor are applied to the gate terminal thereof by at least one capacitor in the preferred embodiments. The detonator ignition energy is also delivered from at least one capacitor in those embodiments of the circuitry for use with missile warheads and shunt resistors are connected to dissipate the energy stored in all of the capacitors for safety reasons.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CIRCUITRY FOR IGNITING DETONATORS

GOVERNMENT INTEREST

The invention described herein may be manufactured, used, and licensed by or for the government for governmental purposes without payment to me of any royalties thereon.

BACKGROUND OF THE INVENTION

The present invention relates generally to means for igniting detonators and more particularly, to circuitry which directs electrical energy to an exploding bridge wire detonator when a trigger signal is applied to an electronic switch.

Detonators of the exploding bridge wire type are ignited by directing electrical energy therethrough. Circuitry for directing electrical energy to such detonators is well known in the art, as evidenced by U.S. Pat. No. 4,934,268 which issued to Don M. Levin on Jun. 19, 1990. Silicon controlled rectifiers (hereinafter SCR's) are commonly found in such circuitry and function to initiate detonator ignition when a trigger signal is applied thereto. However, SCR's that have acceptable operating characteristics for use in detonator ignition circuitry present a problem due to their overwhelming physical size relative to the other circuit components therein. If this relative size factor could be reduced, detonator ignition circuitry would be enhanced for use in many applications, such as missile warheads. Furthermore, when false triggering of a SCR occurs due to RF noise or static electricity, trigger signal control of conduction therethrough can only be regained by interrupting the output current therefrom, which renders reliable solutions to the false triggering problem more difficult.

SUMMARY OF THE INVENTION

It is an object of the present invention to reduce the physical size of detonator ignition circuitry.

It is another object of the present invention to enhance the reliability of detonator ignition circuitry.

These and other objects are accomplished in accordance with the present invention by incorporating a MOS controlled thyristor (hereinafter MCT) into detonator ignition circuitry to reduce the physical size thereof while also providing for ignition reliability enhancement. False triggering is substantially precluded by applying a trigger offset signal to the gate terminal of the MCT. In the preferred embodiments, both the trigger offset and trigger signals are applied from at least one capacitor which may be arranged in a voltage dividing network. When utilized in missile warhead applications, the circuitry of the invention includes at least one capacitor for storing the electrical energy which ignites the detonator. The contacts of a target arrival switch are also included in such circuitry to generate the trigger signal when that switch is actuated. For warhead test applications, a shunt resistor is included in such circuitry to discharge each of the energy storing and gate signal capacitors over a fixed period of time in accordance with preestablished safety criteria.

The scope of the present invention is only limited by the appended claims for which support is predicated on the preferred embodiments hereafter set forth in the following description and the attached drawings wherein like reference characters relate to like parts throughout the several figures.

DESCRIPTION OF THE PREFERRED EMBODIMENTS

Figure 1:
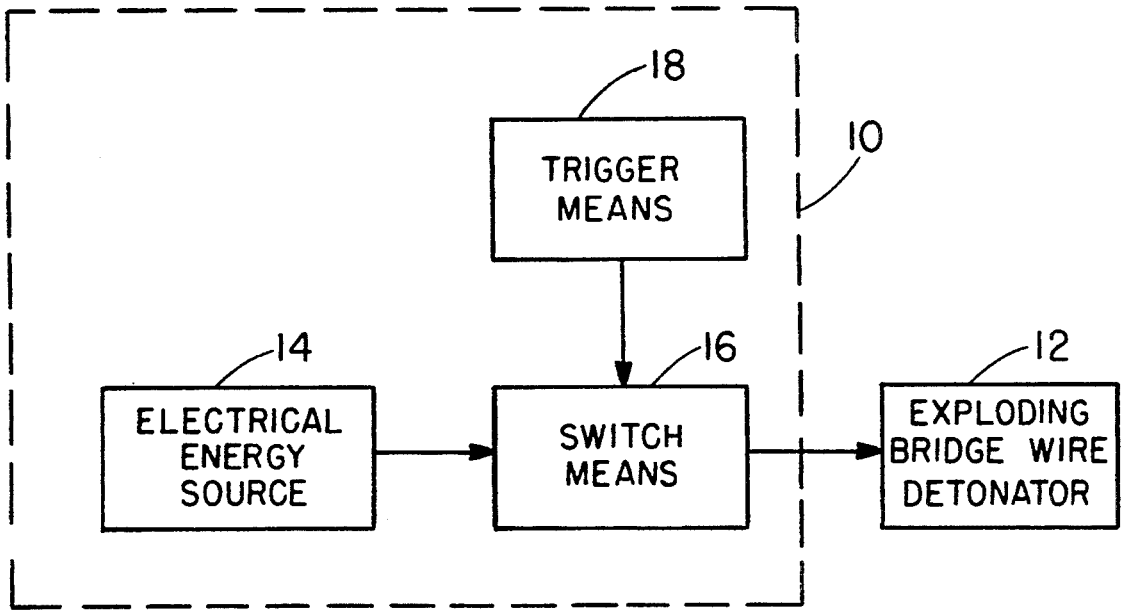
FIG. 1 is a block diagram of the circuitry typically utilized to ignite an exploding bridge wire detonator.

As shown in FIG. 1, circuitry 10 for igniting an exploding bridge wire detonator 12 conventionally includes a source 14 of sufficient electrical energy to ignite the detonator 12, a switch means 16 for directing, the electrical energy to the detonator 12, and a trigger means 18 for actuating the switch means 16 when the detonator 12 is to be ignited. Of course, the sophistication of circuitry 10 depends on the requirements of the application in which the detonator 12 is utilized. Low energy detonators are utilized for many blasting applications such as mining, for which circuitry 10 may include a battery as the electrical energy source 14 and a mechanically actuated switch as both the switch means 16 and the trigger means 18. High energy detonators are utilized for more sophisticated applications such as missile warheads, for which circuitry 10 may include charged capacitors as the electrical energy source 14, while an electronic switch and a target arrival switch respectively, are included as the switch means 16 and in the trigger means 18. The present invention relates to the latter type applications wherein the SCR's commonly utilized as the switch means 16 are very cumbersome in physical size, while RF noise and static electricity generally present false triggering problems.

Figure 2:
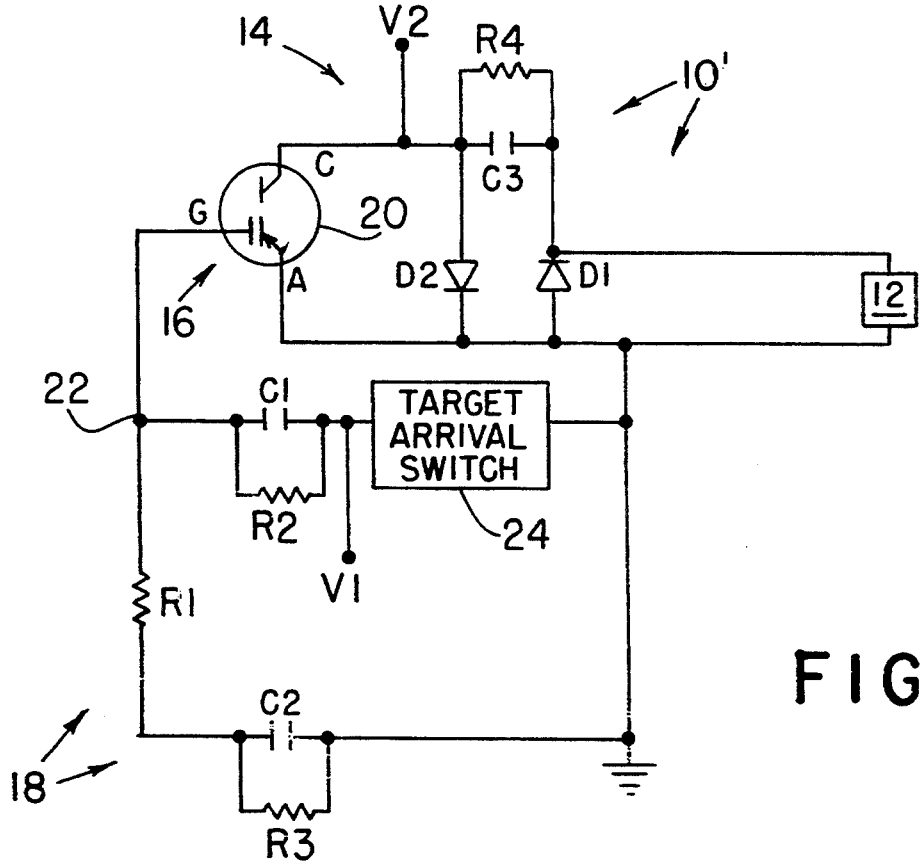
FIG. 2 is a schematic diagram of detonator ignition circuitry in accordance with the present invention.

As shown in circuitry 10' of FIG. 2, the present invention utilizes a MCT 20 for the switch means 16 of FIG. 1. Being available in a modified TO-218 package from Harris Semiconductor, Mountain Top, Pa., the MCT 20 serves to reduce the physical size of circuitry 10'. This size reduction can be appreciated by considering that SCR's having hockey puck or spark plug configurations of approximately one inch in diameter and three inches in height were commonly utilized previously as the switch means 16. Like SCR's, MCT 20 includes anode A, cathode C and gate G terminals and also includes "Kelvin" anode and cathode terminals. Because these "Kelvin" terminals are wired in common with the A and C terminals for the circuitry of the invention, they are not shown in FIG. 2. Also like SCR's, electrical conduction is initiated between the A and C terminals of MCT 20 by applying a trigger signal of a particular polarity to the G terminal thereof. Unlike SCR's however, electrical conduction between the A and C terminals of MCT 20 can be interrupted by applying a prevent or trigger offset signal of opposite polarity to the trigger signal at the G terminal thereof. Such interrupt capability is utilized to enhance detonator ignition reliability in embodiments of this invention. As with SCR's, RF noise and/or static electricity can render MCT 20 conductive by causing either a fast rate of change in voltage across the C and A terminals or a false trigger signal at the G terminal. To nullify the effect of such RF noise and/or static electricity in those embodiments, the prevent or trigger offset signal of opposite polarity to the trigger signal is continuously applied at the G terminal. Because the fast voltage change or the false trigger signal are derived from the RF noise and/or static electricity, their duration is characteristically very short. Consequently, even if the fast voltage change or the false trigger signal of sufficient magnitude occur to cause conduction, as soon as they pass, such conduction will be interrupted by the trigger offset signal. Of course, the duration of the fast voltage change or the false trigger signal must be equal to or greater than the trigger signal response time of MCT 20 for conduction to be initiated therethrough. Furthermore, the detonator 12 has an energy response time which must be exceeded by the duration of MCT 20 conduction for detonator ignition to occur. Therefore, design analysis can be performed once the particular detonator 12, MCT 20 and operating environment are known, to substantially preclude detonator ignition from the fast voltage change or false trigger signal.

Applications do exist for the present invention in environments which are substantially free of RF noise and/or static electricity and wherein only trigger signals need be applied to the G terminal of MCT 20, such as in quality control testing of detonators. However, the detonator ignition circuitry 10' of FIG. 2 is intended for use in high level noise environments, such as those encountered by a missile warhead (not shown). Consequently, a prevent or trigger offset signal is also applied to the G terminal in FIG. 2 for precluding electrical conduction between the A and C terminals when RF noise and/or static electricity would otherwise cause such conduction. At least one capacitor may be utilized in the trigger means 18 of circuitry 10' to derive both the offset trigger and trigger signals at the G terminal. Although such capacitors may be arranged in several different ways for this purpose, the FIG. 2 arrangement applies the offset trigger signal when the capacitors are charged, and the trigger signal when the capacitors are discharged. In circuitry 10' the invention includes two capacitors C1 and C2 which are arranged in a voltage dividing network having at least one output node 22 from which both the offset trigger and trigger signals are applied.

C1 and C2 each have one side thereof connected to the output node 22, with C2 being connected thereto through a resistor R1. The other side of C1 and C2 are connected to ground with C1 being connected thereto through a target arrival switch 24 and also having charge applied to its other side from a DC voltage source V1. Various types of switch 24 could be utilized, such as the crush type which actuates upon impact with the target, or the proximity type which actuates when the missile passes within a predetermined distance from the target. Assuming MCT 20 requires a positive offset trigger signal and a negative trigger signal, the offset trigger signal is applied from output node 22 when C1 is charged with a positive DC voltage V1. Then when the switch 24 is actuated, C1 discharges to ground and the trigger signal will be applied from output node 22. Of course, the values of V1, C1, R1 and C2 all affect the level of offset trigger and trigger signals derived, in accordance with conventional circuit theory. Furthermore, such values can only be determined after the operating characteristics of the MCT 20 are known.

In the electrical energy source 14 of the circuitry 10', a capacitor C3 is connected between the C terminal of MCT 20 and one side of the detonator 12. This side of the detonator 12 is also connected to ground through a diode D1, from its cathode to anode, while the other side of detonator 12 is connected directly to ground. Negative charge from a DC voltage source V2 is applied to the C terminal side of C3 which is also connected to ground through a diode D2 from its anode to cathode. Of course, positive charge of equal magnitude to such negative charge will simultaneously be applied on the other side of C3 through D1. When the trigger signal is applied to the G terminal of MCT 20 therefore, conduction between the C and A terminals thereof discharges the negative charge to ground, while the detonator 12 is ignited by the positive charge being simultaneously discharged therethrough to ground. In circuitry 10' for detonator ignition applications which require the power level stored in C3 to be precisely fixed, D2 may be a zener diode (not shown).

Enhancements may be made to the detonator ignition circuitry 10' of the invention for various reasons. To deactivate the circuitry of FIG. 2 for safety reasons, resistors R2, R3 and R4 may be incorporated therein to shunt across C1, C2 and C3 respectively. The value of R2, R3 and R4 are selected in accordance with conventional circuit theory to dissipate the energy stored by C1, C2 and C3 respectively, in fixed time periods which are predetermined for the particular application. Of course, V1 and V2 may only be intermittently applied in those applications, such as through circuit disconnects (not shown) for missile firing test applications.

Otherwise, lengthy circuit interconnections, such as between the switch means 16 and the detonator 12 may be made with coaxial cable (not shown) to further avoid the possibility of ignition being caused by RF noise. Noise suppressing capacitors (not shown) may also be included in the trigger means 18 to further cope with false trigger signals.

Those skilled in the art will appreciate without any further explanation that within the concept of this invention, many modifications and variations are possible to the above disclosed embodiments of detonator ignition circuitry. Consequently, it should be understood that all such modifications and variations fall within the scope of the following claims.

WHAT I CLAIM IS:

1. In detonator ignition circuitry of the type wherein conduction between the cathode and anode terminals of an electronic switch is initiated by applying a trigger signal to the gate terminal thereof, the improvement comprising:

the electronic switch is a MOS controlled thyristor which reduces the physical size of the circuitry while also providing for ignition reliability enhancement.

2. The circuitry of claim 1 wherein conduction between the cathode and anode terminals is substantially precluded by applying a trigger offset signal to the gate terminal.

3. The circuitry of claim 2 wherein the trigger offset and trigger signals are applied through at least one capacitor.

4. The circuitry of claim 3 wherein said capacitors are arranged in a voltage dividing network having at least one output node from which the trigger offset and trigger signals are applied.

* * * * *